United States Patent
Appanna et al.

(10) Patent No.: US 7,623,464 B2
(45) Date of Patent: Nov. 24, 2009

(54) RAPID PROTOCOL FAILURE DETECTION

(75) Inventors: Chandrashekhar Appanna, Cupertino, CA (US); Anantha Ramaiah, Sunnyvale, CA (US); Ruchi Kapoor, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 906 days.

(21) Appl. No.: 10/888,122

(22) Filed: Jul. 9, 2004

(65) Prior Publication Data

US 2006/0007851 A1    Jan. 12, 2006

(51) Int. Cl.
G01R 31/08 (2006.01)
(52) U.S. Cl. ...................................... 370/242
(58) Field of Classification Search ......... 370/216–217, 370/225, 241–242, 244, 401, 218–224, 410
See application file for complete search history.

(56) References Cited

U.S. PATENT DOCUMENTS

| | | | |
|---|---|---|---|
| 5,506,905 A * | 4/1996 | Markowski et al. ......... 380/262 |
| 5,519,704 A | 5/1996 | Farinacci et al. |
| 6,154,463 A | 11/2000 | Aggarwal et al. |
| 6,173,324 B1 * | 1/2001 | D'Souza .................... 709/224 |
| 6,199,179 B1 | 3/2001 | Kauffman et al. |
| 6,826,613 B1 * | 11/2004 | Wang et al. ................. 709/227 |
| 6,941,384 B1 | 9/2005 | Aiken, Jr. et al. |
| 7,003,574 B1 | 2/2006 | Bahl |
| 2002/0021671 A1 | 2/2002 | Quinlan |
| 2002/0112073 A1 | 8/2002 | MeLampy et al. |
| 2002/0114282 A1 | 8/2002 | MeLampy et al. |
| 2002/0165949 A1 | 11/2002 | Na et al. |
| 2003/0140155 A1 | 7/2003 | Harvey et al. |
| 2003/0223357 A1 | 12/2003 | Lee |
| 2004/0034773 A1 * | 2/2004 | Balabine et al. ............. 713/168 |
| 2004/0081154 A1 | 4/2004 | Kouvelas |
| 2004/0193728 A1 | 9/2004 | Doshi et al. |
| 2004/0210663 A1 | 10/2004 | Phillips et al. |
| 2004/0249966 A1 * | 12/2004 | Asazu et al. ................ 709/231 |
| 2005/0013246 A1 | 1/2005 | Miyake et al. |

(Continued)

OTHER PUBLICATIONS

International Searching Authority, "Notification of Transmittal of the International Search Report and the Written Opinion of the International Searching Authority or the Declaration," PCT/US05/22097, dated Jan. 18, 2006, 9 pages.

(Continued)

Primary Examiner—Kwang B Yao
Assistant Examiner—Tung Q Tran
(74) Attorney, Agent, or Firm—Hickman Palermo Truong & Becker LLP

(57) ABSTRACT

A method is disclosed for rapidly detecting a protocol failure. In one embodiment, the method includes receiving an indication that a first process has failed. The first process having been engaged in communications over one or more network connections with a second process. A packet is formed, such that the packet appears to have been formed by the first process. The packet includes one or more data values, which, when received and processed by the second process, will cause the second process to close the network connection. The packet is sent to the second process. When the second process receives the packet, the second process to closes the network connection.

50 Claims, 8 Drawing Sheets

U.S. PATENT DOCUMENTS

2005/0135233 A1  6/2005  May
2005/0163044 A1*  7/2005  Haq et al. .................. 370/219
2005/0201279 A1  9/2005  Tan et al.
2006/0062142 A1  3/2006  Appanna et al.
2006/0072480 A1  4/2006  Deval et al.
2006/0126502 A1  6/2006  Vasseur et al.
2007/0248108 A1*  10/2007  Visser et al. ................ 370/401

OTHER PUBLICATIONS

Current Claims, PCT/US05/22097, 5 pages.
Network Working Group, "The MD5 Message-Digest Algorithm," RFC 1321, Apr. 1992, retrieved from the internet at <http://www.faqs.org/rfcs/rfc13.21.html>, retrieved on May 17, 2004, 18 pages.

* cited by examiner

RAPID PROTOCOL FAILURE DETECTION

FIELD OF THE INVENTION

The present invention generally relates to packet network communications. The invention relates more specifically to rapid detection of protocol failure in a packet network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a protocol for exchanging routing information between gateway hosts (each with its own router) in a network of autonomous systems. Routers employing BGP interact with peers by establishing TCP sessions. A router may be peered with another router in another domain using External Border Gateway Protocol (EBGP) or with another router within a domain using Internal Border Gateway Protocol (IBGP). In either case current implementations of BGP (including implementations using a network operating system, or IOS) enable the TCP property called RETRANSMIT_FOREVER, which is used to block TCP from tearing down the session even if there is data in the TCP retransmit queue and retransmissions are failing.

One problem that occurs with use of RETRANSMIT_FOREVER is that when the retransmission queue becomes empty, such "idle" sessions are not torn down. These idle sessions continue to exist, using up resources to track and maintain them.

One approach to addressing this issue is to provide an application level "keepalive" mechanism to detect session related problems that require the session to be terminated. This "keepalive" mechanism terminates a session when a specified number of successive keepalive messages are lost. In other words, if no keepalive message is received for the duration of a specific period of time, called the 'holdtime,' the session is terminated. The values of keepalive time and holdtime are configurable. The default is 60 seconds for keepalive time and 180 seconds for holdtime.

Unfortunately, this approach has disadvantages. In order to quickly detect peer BGP application failures, many customers set the holdtime and the keepalive time to values in the order of a few seconds. In today's high speed networks, however, both the defaults and the retuned values that are in the order of seconds are very long times. Thus, even with re-tuning these values to the order of seconds, the idle sessions continue to place a large burden on BGP implementations in terms of processing power and scalability of the number of BGP sessions that a router can support.

Based on the foregoing, there is a clear need for a mechanism that will enable detection of session failures with improved speed relative to conventional techniques. Further, it is desirable that the failure detection mechanism will not adversely affect BGP scalability.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
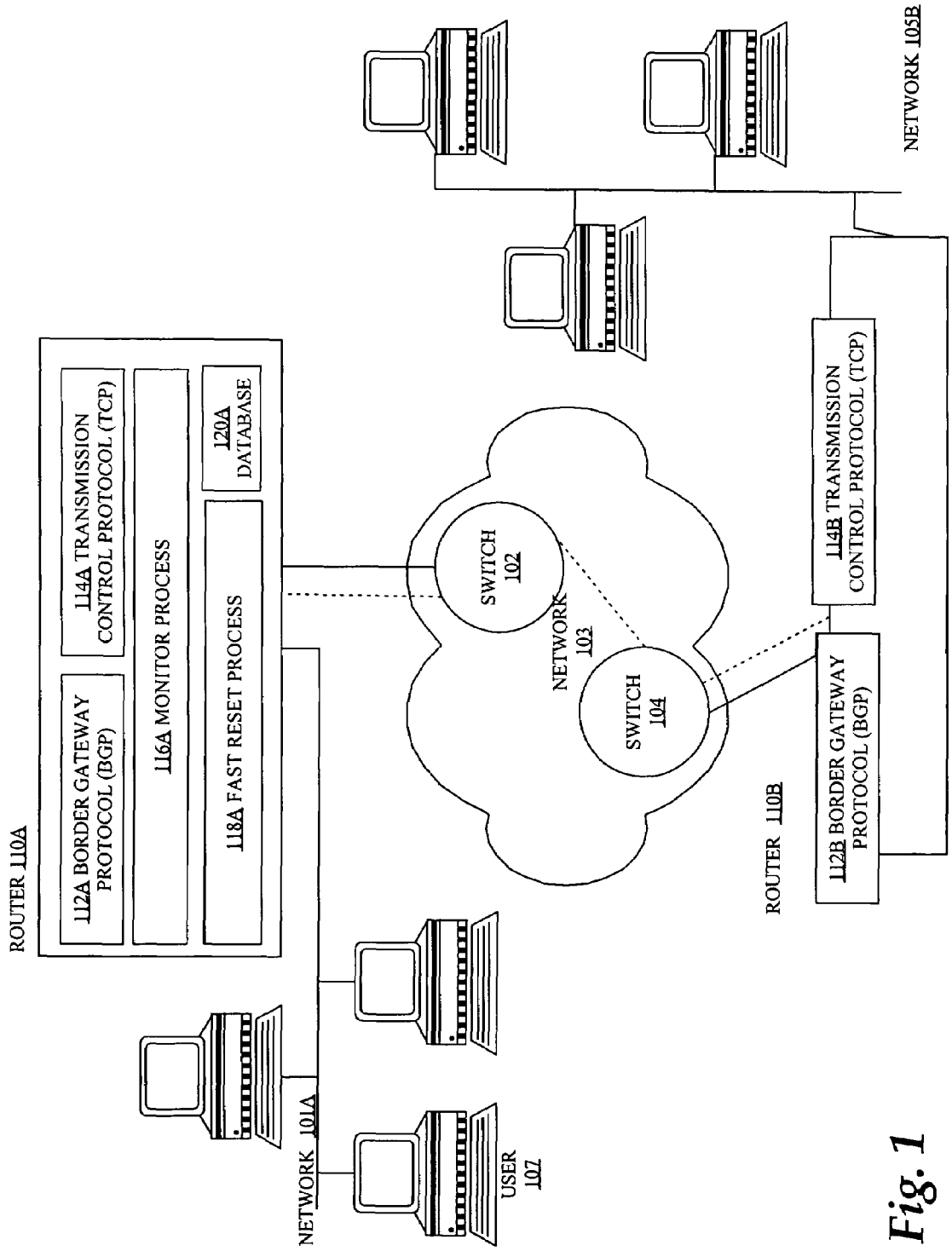
FIG. 1 is a block diagram depicting an example network in which detecting a protocol failure in a packet network may be implemented in one embodiment of the invention.

A method and apparatus for rapid protocol failure detection is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Overview
  3.0 Method of Rapidly Detecting a Protocol Failure
    3.1 Overview
    3.2 Process Of Forming a Packet Appearing to Come from the Failed Process
    3.3 Process Of Responding To An Ack From The Connection
    3.4 Message Flows for the Process Of Rapidly Detecting a Protocol Failure
  4.0 Implementation Mechanisms—Hardware Overview
  5.0 Extensions and Alternatives 1.0 General Overview The needs identified in the foregoing Background, and other needs and objects that will become apparent for the following description, are achieved in the present invention, which comprises, in one aspect, a method for rapidly detecting a protocol failure. In one embodiment, the method includes receiving an indication that a first process has failed. The first process having been engaged in communications over one or more network connections with a second process. A packet is formed, such that the packet appears to have been formed by the first process. In specific embodiments, the packet is formed based upon a correct address for the first process and the second process retrieved from a stored 4 or 5 tuple. The packet includes one or more data values, which, when received and processed by the second process, will cause the second process to close the network connection. The packet is sent to the second process. When the second process receives the packet, the second process to closes the network connection.

In one embodiment, information about each network connection associated with the first process is retrieved from a database. Packets appearing to have been formed by the first process, which, when received and processed by the second process, will cause the second process to close the network connection are formed and sent. The data values of successive packets identify each network connection associated with the first process in the database.

In one embodiment, forming a packet appearing to have been formed by the first process includes determining a random number. The packet is formed to have a sequence field set to the random number and a SYN field set to 1.

In one embodiment, the packet includes a source address value and a source port value corresponding to the first process and a destination address value and a destination port value corresponding to the second process. In one embodiment, the packet further includes an ACK field set to 0.

In one embodiment, if the random number falls within an expected sequence number range of the second process, the second process sends a reset packet to the first process prior to closing the network connection. If the random number falls outside of the expected sequence number range of the second process, however, an ACK packet is received from the second process.

A sequence number and an acknowledgement number are retrieved from the ACK packet. A reset packet is formed, which includes a sequence number based upon the acknowledgement number. The reset packet is sent to the second process.

In one embodiment, forming a reset packet comprising a sequence number based upon the acknowledgement number includes forming the packet having a sequence number field set based upon the acknowledgement number and a RST field set to 1. In one embodiment, the packet includes a source address value and a source port value corresponding to the first process and a destination address value and a destination port value corresponding to the second process. In one embodiment, the packet further includes an ACK field set to the random number. This processing enables the packet to appear to originate with the failed process.

In one embodiment, the receiving, forming and sending steps are performed on a standby route processor of a multiple route processor router. In one embodiment, the receiving, forming and sending steps are performed on a route processor of a router.

In one embodiment, information about one or more specified network connections associated with the first process for which reset processing is desired is stored in the database. In one embodiment, the information about each network connection includes: a source IP address, a destination IP address, source TCP port and a destination TCP port. In one embodiment, the information about each network connection also includes an encryption signature.

In one embodiment, the first process comprises a border gateway protocol (BGP) process. In one embodiment, the first process and the second process communicate using transmission control protocol (TCP).

In one embodiment, receiving an indication that a first process has failed includes receiving a message from a monitoring process provided by an operating system of a router. In one embodiment, receiving an indication that a first process has failed includes receiving a message from a monitoring process remotely located on a separate platform from the first process.

In one embodiment, forming a packet appearing to have been formed by the first process includes forming a packet having a source IP address value based upon a correct address for the first process retrieved from stored information. In specific embodiments, the information is stored as a 4 or 5 tuple.

In another aspect, the invention provides a method of detecting a protocol failure. In one embodiment, the method comprises a plurality of computer-implemented steps. An indication that a first process, which has been engaged in communications over one or more network connections with a second process, has failed is received. Information about each network connection associated with the first process is retrieved from a database. A random number is determined. A packet appearing to have been formed by the first process is formed. The packet includes one or more data values, including a sequence field set to the random number and a SYN field set to 1 so that when the packet is received and processed by the second process, the packet will cause the second process to close the network connection. The packet is sent to the second process to cause the second process to close the network connection. An ACK packet may be received from the second process, if the random number falls outside of an expected sequence number range of the second process. If the ACK packet is received, then responsive thereto, a sequence number and an acknowledgement number are retrieved from the ACK packet. A reset packet is formed. The reset packet includes a sequence number based upon the acknowledgement number. The reset packet is sent to the second process.

In other aspects, the invention encompasses a computer apparatus and a computer-readable medium configured to carry out the foregoing steps.

2.0 Structural and Functional Overview

FIG. 1 is a block diagram depicting an example network in which detecting a protocol failure in a packet network may be implemented in one embodiment of the invention. While the invention is illustrated generally with reference to an example of peered router devices supporting BGP over TCP sessions deployed in a network environment, the present invention does not require such implementation, and in some embodiments, techniques according to the invention may be implemented for other protocols and/or in other types of peered devices, such as a DSL modem, a cable modem, a router, a wireless access point or various combinations thereof.

In the example configuration depicted by FIG. 1, router 110A has been installed by an IT administrator of a network 101A in order to connect network 101A to network 103. When the router 110A is installed, it is communicatively coupled to a switch 102 of network 103 to establish a physical connection through which the router 110A is capable of connecting to a router 110B through the network 103. Router 110B connects to a network 105B. In the embodiment illustrated by FIG. 1, peered routers 110A and 110B enable devices on network 101A to communicate with devices on network 105B via network 103. Networks 101A and 105B may be any type of network and may be of different types from one another. Network 103 may be the Internet, one or more other public networks or one or more private networks in various embodiments. Routers 110A and 110B comprise border gateway protocol 112A, 112B and transmission control protocol 114A, 114B, respectively, which may communicate with one another as peers.

In one embodiment, one or more of routers 110A and 110B (router 110A in FIG. 1) include a monitor process 116A for detecting a failure in the communications between routers 110A and 110B by processes using transmission control protocol 114A, 114B. The monitoring process 116A may be part of an operating system of a router, a process remotely located on a separate platform from the first process or integrated or partially integrated with a fast reset process 118A. As further illustrated by FIG. 1, router 110A includes a fast reset process 118A that notifies the router 110B quickly in the event that the router 110A device suffers a protocol error or a device fault affecting communications between routers 110A and 110B. Router 110B also may include a fast reset process and a monitoring process; these are not shown in FIG. 1 for purposes of clarity. The ability to rapidly notify a remote device, such as router 110B in the event that the router 110A loses communications is provided by one embodiment that will be described in further detail below.

As can be seen from FIG. 1, a communication path may be established from router 110A to router 110B via switch 102 and switch 104 of network 103. In one configuration, border gateway protocol (BGP) 112A listens on TCP port 179 for connection requests from peers. Also, BGP 112A initiates connections to the other peers listening on TCP port 179. Whenever a connection is established between two BGP peers by either passive open (i.e., connection opened by a server) or active open (i.e., connection opened by a client) methods, a 4 tuple that uniquely represents the connection is returned by TCP. The 4 tuple is:

<SRC IP ADDRESS, DST IP ADDRESS, SRC TCP PORT, DST TCP PORT>

The above 4 tuple is qualified further by an MD5 signature if the session is signed. For further information concerning Message-Digest Algorithm (MD5), reference may be had to RFC 1321. In embodiments using MD5, the connection is uniquely identified by the 4 tuple, however, for purposes of generating valid packets for the session, the following 5-tuple is used:

<SRC IP ADDRESS, DST IP ADDRESS, SRC TCP PORT, DST TCP PORT, MD5 KEY>

According to one embodiment when BGP accepts a connection, it will inform TCP that fast reset support is used for the session. TCP in turn will inform the fast reset process 118A of the 4 or 5 tuple described above, for this session.

The fast reset process 118A interacts with BGP 112A and TCP 114A and, in combination with monitoring process 116A, watches for the abnormal termination of BGP 112A and/or TCP 114A. Fast reset process 118A maintains 4/5 tuples that use fast reset support in a database 120A. In addition, fast reset process 118A may send the 4/5 tuple data over to a standby route processor (RP) in a dual RP architecture, which will be described in further detail below with reference to FIG. 5.

3.0 Method of Rapidly Detecting a Protocol Failure 3.1 Overview

According to one embodiment, when the BGP process 112A terminates abnormally, the fast reset process 118A will be notified since the monitoring process 116A monitors the BGP process 112A for abnormal termination. In response to the BGP process 112A's abnormal termination, fast reset process 118A creates TCP SYN packets for each session in the database 120A associated with the BGP process 112A.

3.2 Process of Forming a Packet Appearing to Come from the Failed Process

Figure 2A:
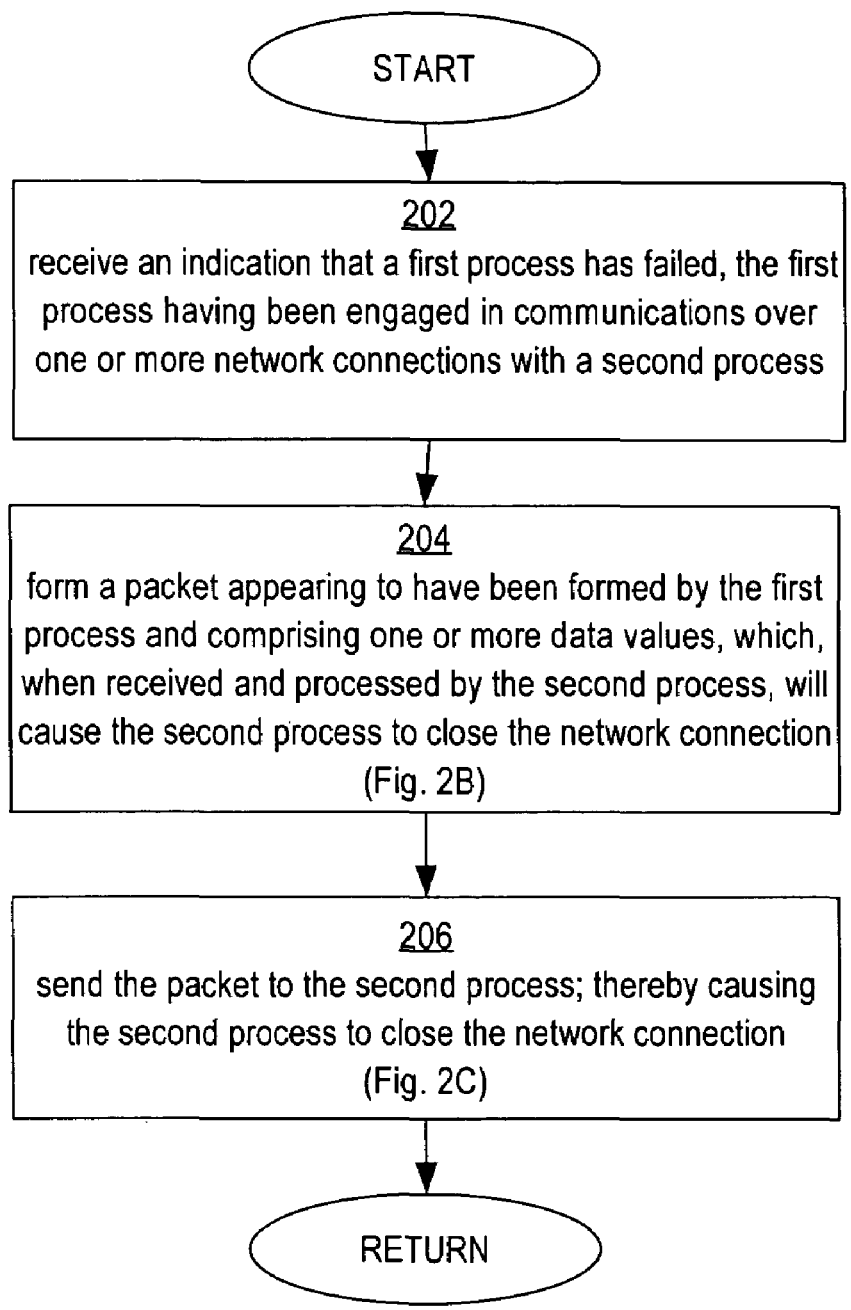
FIG. 2A is a flow diagram that illustrates a high level overview of one embodiment of processing for detecting a protocol failure in a packet network.

FIG. 2A is a flow diagram that illustrates a high level overview of one embodiment of processing for detecting a protocol failure in a packet network. In FIG. 2A, a first process has been engaged in communications over one or more network connections with a second process. In block 202, an indication that a first process has failed is received by the fast reset process 118A. In various implementations, the indication may be received from a monitoring process 116A, which may be a stand-alone process or part of an operating system of router 110A. In block 204, a packet appearing to have been formed by the first process is formed by the fast reset process 118A. The packet includes one or more data values, which, when received and processed by the second process, will cause the second process to close the network connection. In block 206, the packet is sent to the second process; thereby causing the second process to close the network connection.

Figure 2B:
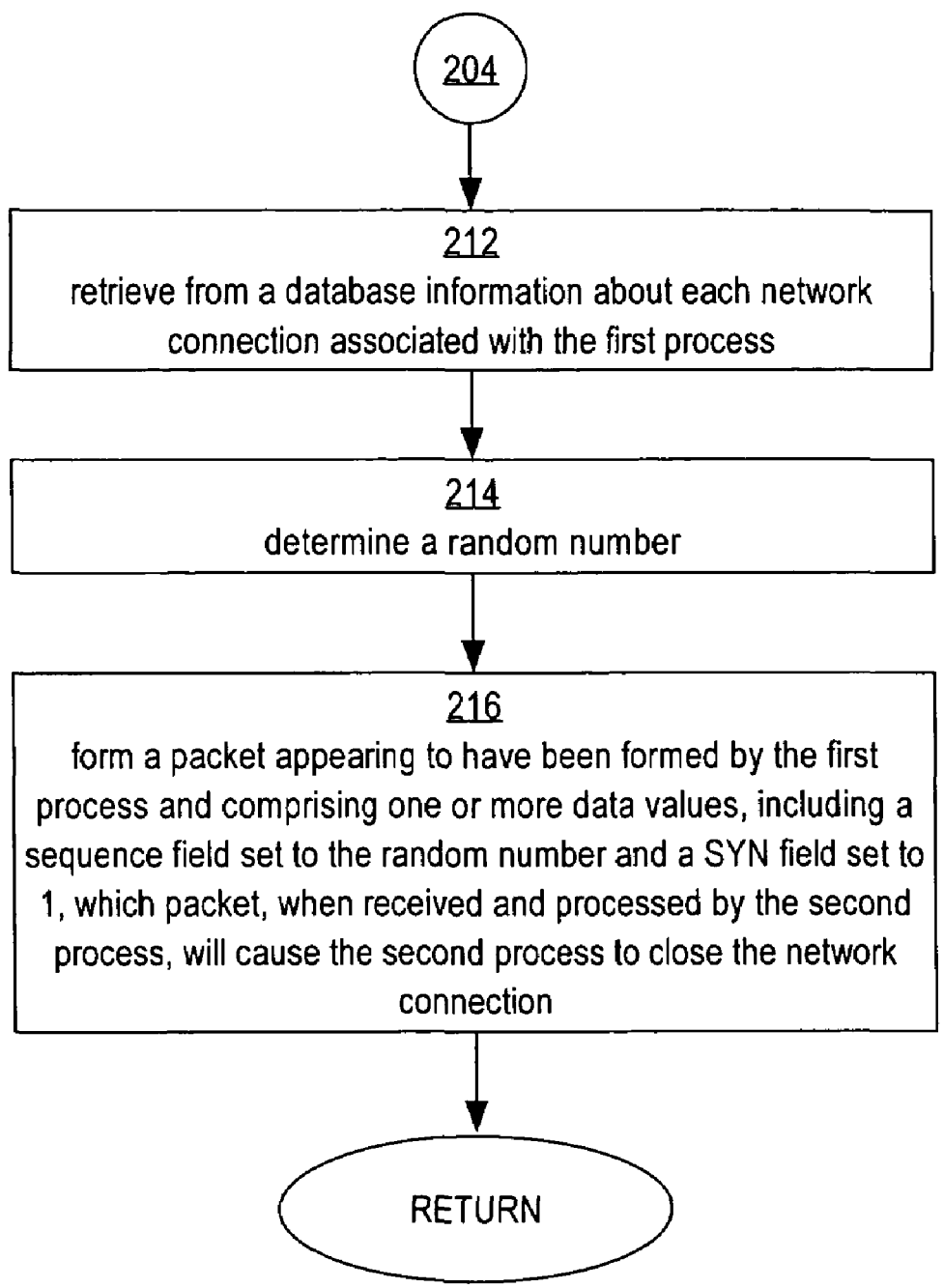
FIG. 2B is a flow diagram that illustrates a high level overview of forming a packet appearing to come from a failed process operable with the processing depicted by FIG. 2A in one embodiment.

FIG. 2B is a flow diagram that illustrates a high level overview of forming a packet appearing to come from a failed process operable with the processing depicted by FIG. 2A in one embodiment. In block 212, information about each network connection associated with the first (failed) process is retrieved from a database. In block 214, a random number is determined. In block 216, the packet appearing to have been formed by the first process is formed. The packet includes one or more data values, including a sequence field set to the random number and a SYN field set to 1, which packet, when received and processed by the second process, will cause the second process to close the network connection.

In one embodiment, the fast reset process 118A creates TCP SYN packets having the following format for each session in database 120A:

[STORED DST IP ADDR, STORED SRC IP ADDR, STORED DST PORT, STORED SRC PORT, SEQ*, ACK*, FLAGS]

where

SEQ* is a fixed value set to a randomly generated number "FEEDBACC".

ACK* will be set to 0.

FLAGS has the SYN bit set to 1.

If MD5 is configured for the session, a TCP MD5 option will also be added. In one embodiment, a random number is selected for the value of "FEEDBACC". This enables the fast reset process 118A to prepare the packet to appear as though it originated with the first process, which has failed and is no longer able to send packets nor provide an appropriate sequence number.

3.3 A Process of Responding to an ACK from the Connection

In one embodiment in which TCP 114A is compliant with RFC 793, TCP 114A and 114B will accept a RST segment or SYN packet if the sequence number of the segment falls within a window or range of acceptable values, even if the sequence number is not an exact match to the next expected sequence number. This approach is used to compensate for the possibility that packets may be lost. In some implementations of TCP the range of allowed sequence values may be as large as 16,000 to more than 50,000 values.

When the TCP stack on the peer (i.e., TCP 114B) receives the SYN packets from the fast reset process 118A, the receiver TCP 114B will check the value of "FEEDBACC" in the packet. If "FEEDBACC" happens to fall within the expected receive sequence number range, the peer TCP 114B will respond by clearing the session locally and notifying the local BGP process 112B. It will also respond with a RST since it is not expecting a SYN from the router 110A for a connection that is already in a synchronized state. If the value of "FEEDBACC" in the SYN packets does not fall within the expected receive sequence number range, receiver TCP 114B will respond with an TCP ACK packet. This TCP ACK packet will have a seq* value set to the next sequence number for data from the router 110B to router 110A and will have the ack# set to the next sequence number expected for data from router 110A to router 110B. Using this mechanism, it is possible for the fast reset process 118A to obtain the correct sequence number to send out to the router 110B without any protocol changes either at the TCP level or BGP level.

Figure 2C:
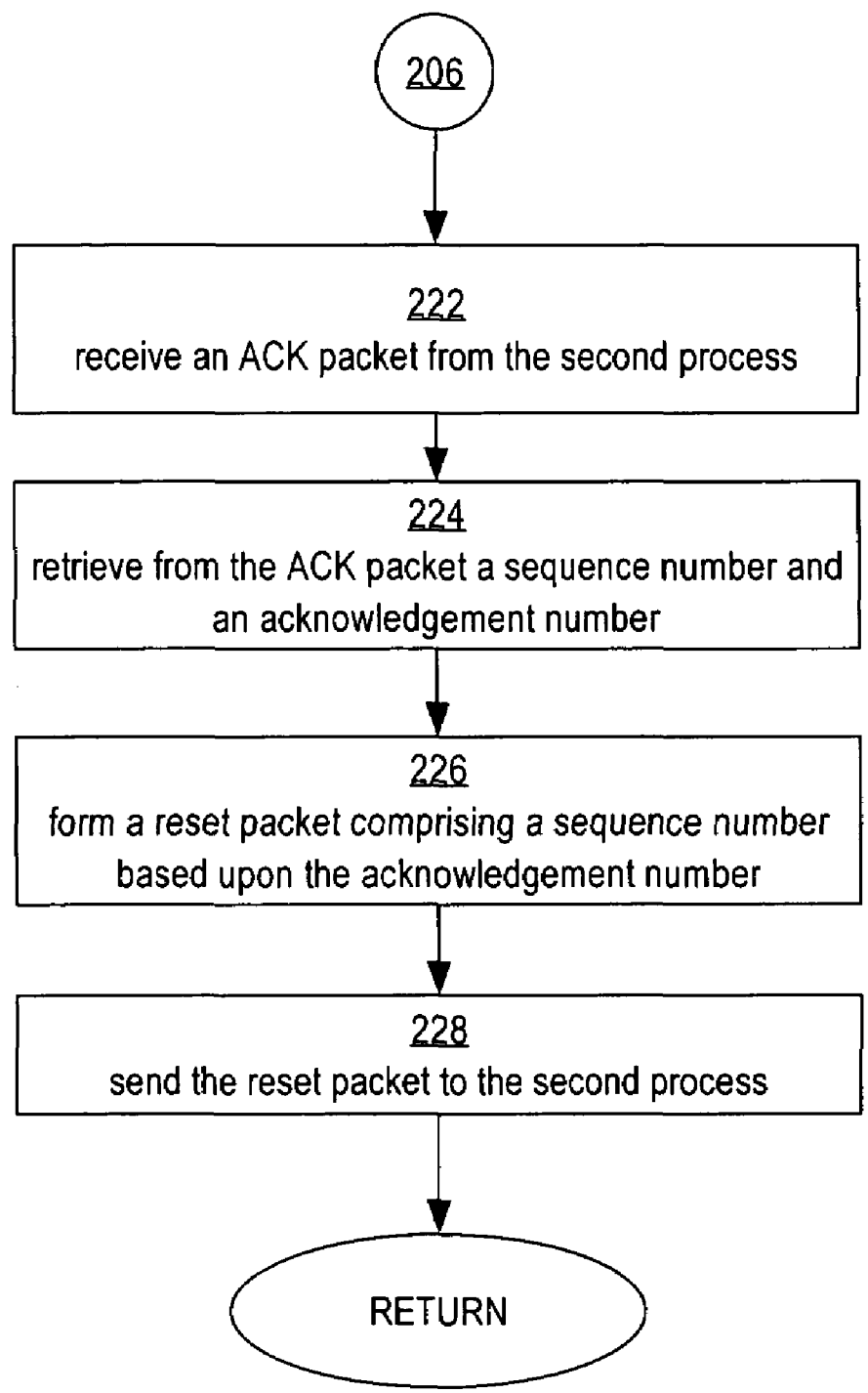
FIG. 2C is a flow diagram that illustrates a high level overview of processing performed in response to receiving an acknowledgement packet from a second process that has been in communications with a failed process operable with the processing depicted by FIG. 2A in one embodiment.

FIG. 2C is a flow diagram that illustrates a high level overview of processing performed in response to receiving an acknowledgement packet from a second process that has been in communications with a failed process operable with the processing depicted by FIG. 2A in one embodiment. In block 222, an ACK packet from the second process is received. In block 224, a sequence number and an acknowledgement number are retrieved from the ACK packet. In block 226, a reset packet is formed. The reset packet includes a sequence number based upon the acknowledgement number. In block 228, the reset packet is sent to the second process.

Once router 110A receives the TCP ACK packet, the fast reset process 118A generates a TCP RST packet of the type:

[STORED DST IP ADDR, STORED SRC IP ADDR, STORED DST PORT, STORED SRC PORT, SEQ*, ACK#, FLAGS]

where
 SEQ* is equal to the ack* received from the peer TCP 114B in the TCP ACK packet.
 ACK* will be set to "FEEDBACC".
 FLAGS has the RST bit set to a 1.

Similarly, when the TCP process 114A terminates abnormally, the fast reset process 118A will be notified since the monitoring process 116A will also be watching for the abnormal termination of the TCP process 114A. In this case, the difference between the above procedures is that the fast reset process 118A will also take over all TCP packet processing in the system until it has finished sending all the SYN/RST packets as described in above procedures and the TCP process 114A has restarted. This step is not necessary if the TCP process 114A has not terminated abnormally because the TCP process 114A will have all the information including the MD5 key to generate RST packets in response to the received TCP ACK packets.

3.4 Message Flows for the Process of Rapidly Detecting a Protocol Failure

Figure 3A:
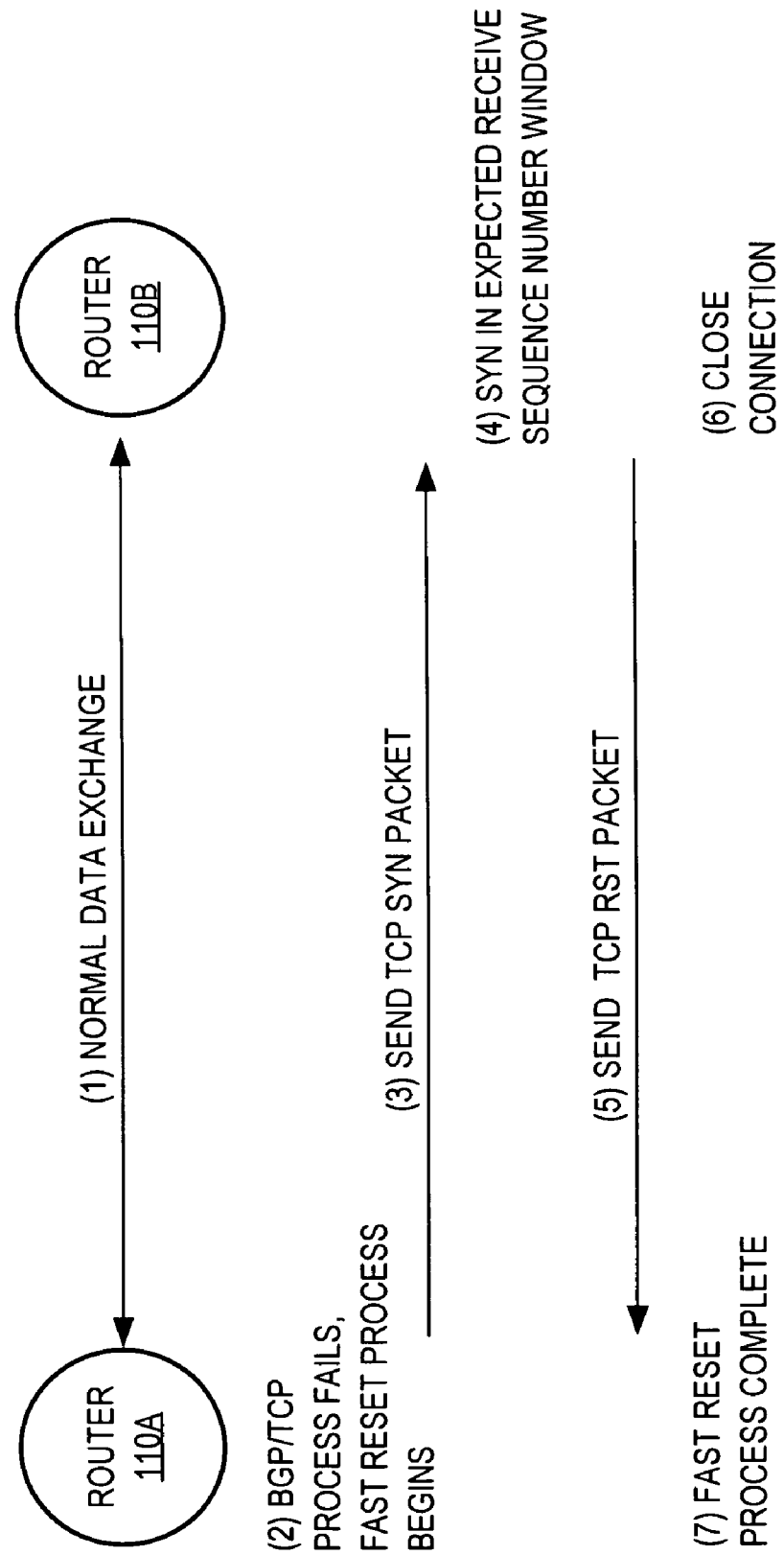
FIG. 3A is a message flow diagram that illustrates TCP messages exchanged by routers using the process of FIGS. 2A-2C in which the sequence number falls within an expected range of sequence numbers.
Figure 3B:
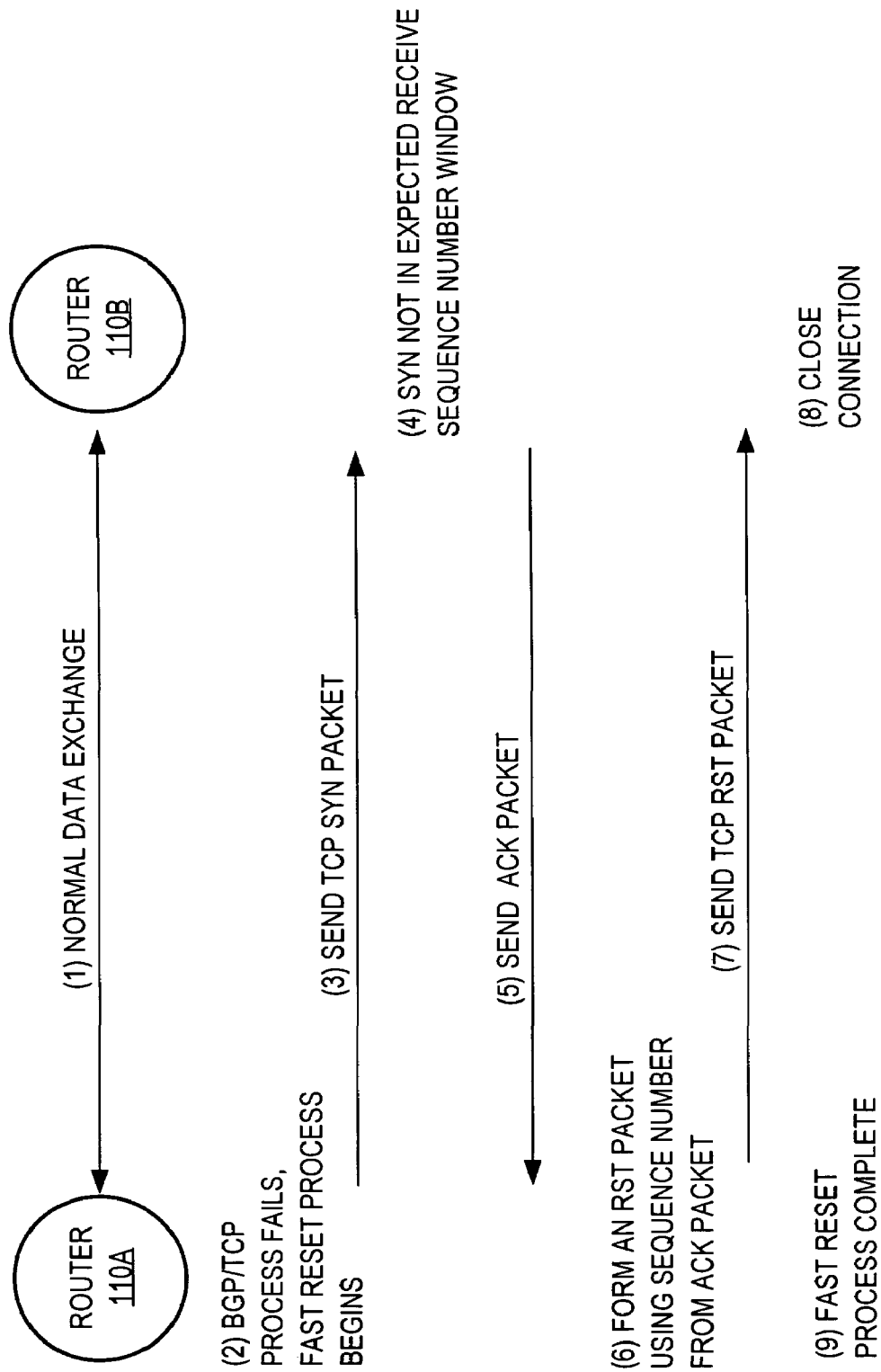
FIG. 3B is a message flow diagram that illustrates TCP messages exchanged by routers using the process of FIGS. 2A-2C in which the sequence number is outside of an expected range of sequence numbers.

An approach for rapidly detecting protocol failures is now described with reference to FIGS. 3A-3B. FIG. 3A is a message flow diagram that illustrates TCP messages exchanged by routers using the process of FIGS. 2A-2B in which the sequence number falls within an expected range of sequence numbers; FIG. 3B is a message flow diagram that illustrates TCP messages exchanged by routers using the process of FIGS. 2A-2C in which the sequence number is outside of an expected range of sequence numbers.

Referring to FIG. 3A, assume that routers 110A and 110B have established normal TCP communication as indicated by arrow 1, and a protocol failure occurs with a process at router 110A, as indicated by numeral 2. In response, using the process of FIGS. 2A-2C, the endpoint detecting the failure, router 110A, forms a TCP SYN packet and sends this packet to the other endpoint as indicated by arrow 3 of FIG. 3A. Router 110B checks the sequence number of the SYN packet and, in the first case finds that the sequence number is within an expected range of sequence numbers as indicated by numeral 4. Accordingly, router 110B sends a TCP RST packet to router 110A, as shown by arrow 5. Because router 110B was not expecting a SYN from router 110A for a connection that is already in a synchronized state, router 110B will clear this connection locally and notify the local BGP process 112B, as indicated by numeral 6. Router 10B will also respond with an RST packet, as indicated by arrow 5. As a result, the fast reset process 118A has detected the protocol failure and caused the connection to be closed, as indicated by numeral 7.

Now referring to FIG. 3B, again assuming that routers 110A and 110B have established normal TCP communication as indicated by arrow 1, and a protocol failure occurs with a process at router 110A, as indicated by numeral 2. In response, using the process of FIGS. 2A-2C, the endpoint detecting the failure, router 110A, forms a TCP SYN packet and sends this packet to the other endpoint as indicated by arrow 3 of FIG. 3B. Router 110B checks the sequence number of the SYN packet and, in this case finds that the sequence number is outside of an expected range of sequence numbers as indicated by numeral 4. Accordingly, router 110B sends a TCP ACK packet to router 110A, as shown by arrow 5. Because router 10B has received a SYN from router 10A in which the sequence number does not fall within the expected receive sequence number range, router 110B will respond with a TCP ACK packet. This TCP ACK packet will have a seq* value set to the next sequence number for data from the router 110B to router 110A and the ack# will be set to the next sequence number expected for data from router 110A to router 110B. Once router 110A receives the TCP ACK packet, the fast reset process 118A generates a TCP RST packet having the sequence value set to the ack# value from the ACK packet (the next sequence number expected by router 110B for data from router 110A) and the ack# set to the randomly generated number, FEEDBACC, which is the next sequence number expected for data from the router 10B to router 110A as indicated by numeral 6. Setting the ack# of the RST packet to FEEDBACC provides a means of identifying the packet, however, this is not required and in alternative embodiments, the ack# of the RST may be set to a number different from FEEDBACC. Router 10A sends the RST packet to router 10B as indicated by arrow 7. When router 10B receives the RST packet, router 110B will clear this connection locally and notify the local BGP process 112B, as indicated by numeral 8. As a result, the fast reset process 118A has detected the protocol failure and caused the connection to be closed down, as indicated by numeral 9.

4.0 Implementation Mechanisms—Hardware Overview

Figure 4:
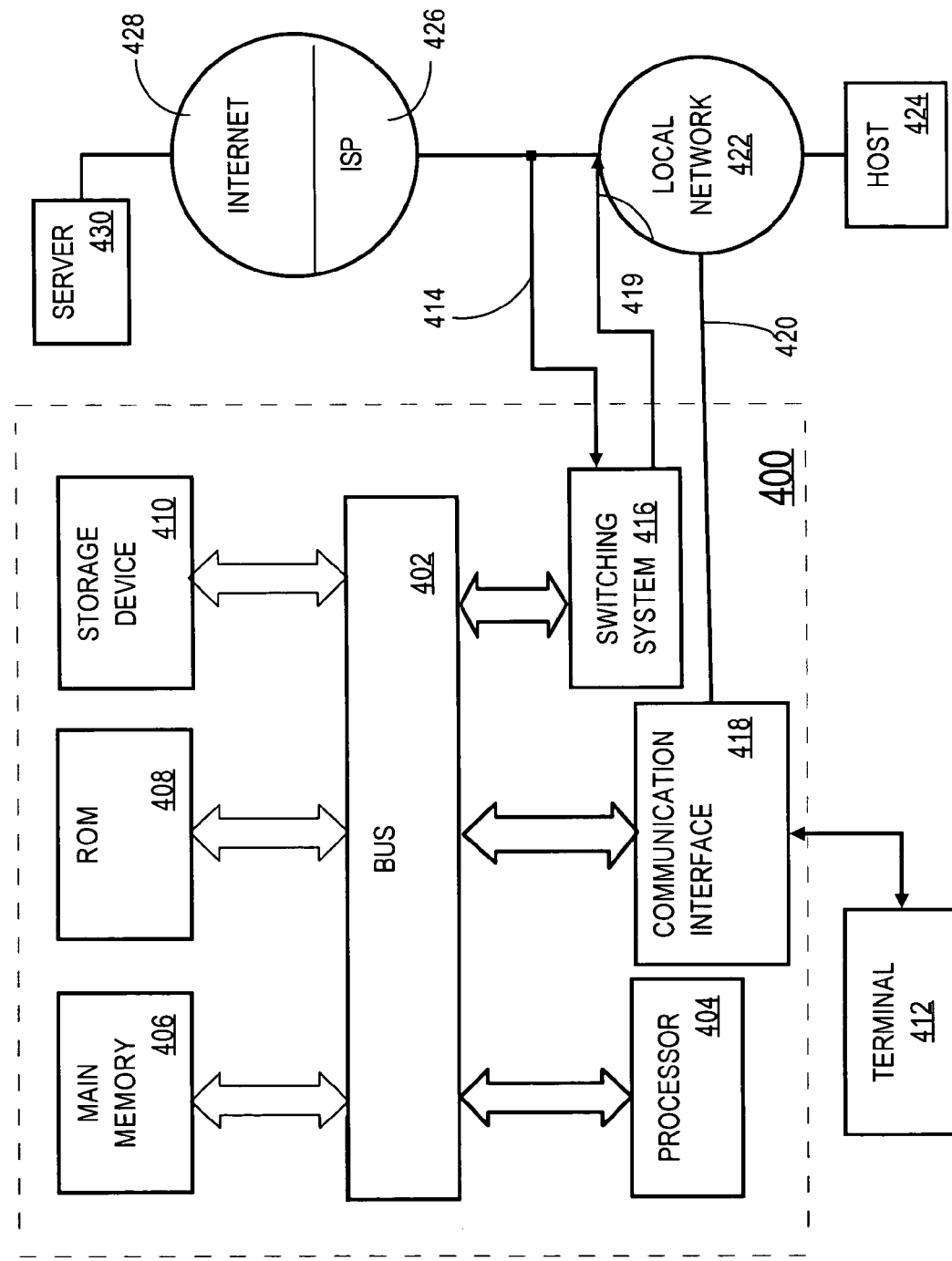
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for rapid protocol failure detection. According to one embodiment of the invention, rapid protocol failure detection is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for rapid protocol failure detection as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

Figure 5:
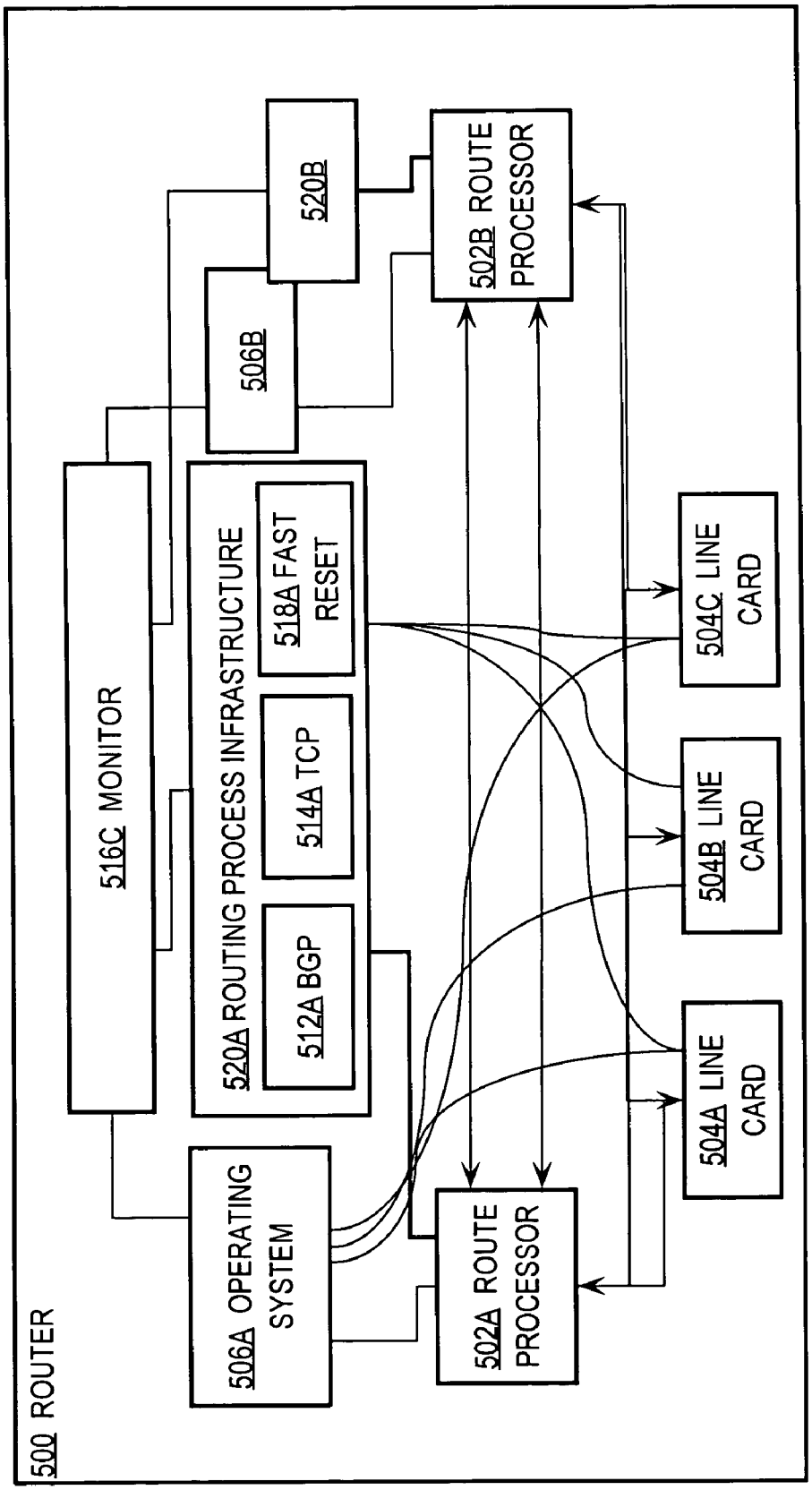
FIG. 5 is a simplified block diagram of a router for a packet-switched network, the router having a plurality of route processors and line cards in which an embodiment may be implemented.

FIG. 5 is a simplified block diagram of a router for a packet-switched network, the router having a plurality of route processors and line cards in which an embodiment may be implemented. FIG. 5 illustrates an example router embodiment in which the techniques described herein with reference to FIGS. 2A-2C may be implemented. However, the techniques herein are applicable to other implementations as well. For example, while FIG. 5 depicts route processors, the techniques herein are equally applicable to line cards, processors that are not route processors, and others. In FIG. 5, a router 500 comprises a first route processor 502A and a second route processor 502B. Each of the processors 502A, 502B is communicatively coupled to one or more line cards 504A, 504B, 504C. There may be any number of line cards.

Each of the route processors 502A, 502B executes or interacts with a respective instance of an operating system 506A, 506B and a respective instance of routing process infrastructure 520A, 520B. For example, route processor 502A is associated with operating system 506A and routing process infrastructure 520A; similarly, route processor 502B uses operating system 506B and routing process infrastructure 520B. Operating system 506A, 506B may be instances of the same version or different versions. Routing process infrastructures 520A, 520B may be identical instances when their versions are the same, or may be different instances when their versions are different. Routing process infrastructures 520A, 520B generally are responsible for transferring messages. Routing process infrastructures 520A, 520B enable interoperation of peer software implementations under the control of operating system 506A, 506B, and peer clients thereof. In one embodiment, routing process infrastructure 520A includes BGP 512A, TCP 514A, and fast reset process 518A. Corresponding components may exist in routing process infrastructure 520B as well. The use of routing process infrastructures 520A, 520B is described further below.

Route processors 502A, 502B typically serve as Active and Standby processors, respectively. The Active and Standby processors may comprise route processors, line cards, etc. Each of the route processors 502A, 502B may host one or more processes, including an operating system, applications or features (collectively "peer clients"). To illustrate a clear example, FIG. 5 shows two route processors 502A, 502B; however, in practice there may be any number of Active and Standby processors.

In embodiments having operating system architectures in which multiple processes in separate address spaces are supported, the fast reset process 518A may be embodied as a standalone process separate from BGP 512A and TCP 514A. In an operating system architecture that is based on a single address space and where a fault in one process resets the entire route processor, the fast-reset process 518A on the active RP is primarily used for check pointing data on the standby RP 502B. The fast reset process (not shown in FIG. 5) on the standby RP 502B performs the fast reset when the active RP 502A experiences a failure.

The techniques herein are generally applicable to routers, switches, gateways, etc. In one embodiment, compatibility information created and stored in a pre-processing phase, and is available later in a runtime phase when the system first initializes so that the appropriate redundant system behavior can be determined at that time.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of detecting a protocol failure, the method comprising the computer-implemented steps of:

receiving an indication that a first process has failed, the first process having been engaged in communications over a network connection with a second process, the network connection having a source address and a destination address;

retrieving from a database information about the network connection, wherein the information retrieved from the database indicates the source address and the destination address of the network connection;

determining a random number;

based on the information retrieved from the database, forming a packet comprising the source address, the destination address, a sequence field set to the random number, and a SYN field set to 1;

wherein the packet is formed by a third process that is different from the first and second processes;

the third process sending the packet to the second process; thereby causing the second process to close the network connection with the first process;

wherein the random number falls within an expected sequence number range of the second process; thereby causing the second process to send a reset packet to the first process prior to closing the network connection; and wherein the method is performed by one or more computing devices.

2. A method as recited in claim 1, further comprising the steps of:

wherein the first process was engaged in communications over a plurality of network connections with the second process, each network connection of the plurality of network connections having a corresponding source address and a destination address;

retrieving from a database information about each network connection of the plurality of network connections;

wherein the information about each network connection comprises information about corresponding source addresses and destination addresses; and based on the database information about each network connection, for each network connection of the plurality of network connections, the third process forming and sending to the second process a packet comprising the corresponding source address, the corresponding destination address, a sequence field set to a random number, and a SYN field set to 1.

3. A method as recited in claim 1, wherein the packet further includes a source port value corresponding to the first process and a destination port value corresponding to the second process.

4. A method as recited in claim 1, wherein the packet further includes an ACK field set to 0.

5. A method as recited in claim 1, wherein the receiving, forming and sending steps are performed on a standby route processor of a multiple route processor router.

6. A method as recited in claim 1, wherein the receiving, forming and sending steps are performed on a route processor of a router.

7. A method as recited in claim 2, further comprising the step of:

storing in the database information about one or more specified network connections associated with the first process for which reset processing is desired.

8. A method as recited in claim 7, wherein the information about each network connection comprises: a source IP address, a destination IP address, source TCP port and a destination TCP port.

9. A method as recited in claim 8, wherein the information about each network connection further comprises: an encryption signature.

10. A method as recited in claim 1, wherein the first process comprises a border gateway protocol (BGP) process.

11. A method as recited in claim 1, wherein the first process and the second process communicate using transmission control protocol (TOP) protocol.

12. A method as recited in claim 1, wherein receiving an indication that a first process has failed includes
receiving a message from a monitoring process provided by an operating system of a router.

13. A method as recited in claim 1, wherein receiving an indication that a first process has failed includes
receiving a message from a monitoring process remotely located on a separate platform from the first process.

14. A method of detecting a protocol failure, the method comprising the computer-implemented steps of:
receiving an indication that a first process has failed, the first process having been engaged in communications over one or more network connections with a second process;
retrieving from a database information about each network connection associated with the first process;
determining a random number;
forming a packet comprising one or more data values, including a sequence field set to the random number and a SYN field set to 1, which packet, when received and processed by the second process, will cause the second process to close the network connection;
wherein the packet is formed by a third process;
sending the packet to the second process; thereby causing the second process to close the network connection; and
receiving an ACK packet from the second process, if the random number falls outside of an expected sequence number range of the second process; and responsive thereto:
retrieving from the ACK packet a sequence number and an acknowledgement number;
forming a reset packet comprising a sequence number based upon the acknowledgement number; and
sending the reset packet to the second process;
wherein the method is performed by one or more computing devices.

15. A computer-readable storage medium storing one or more sequences of instructions for detecting a protocol failure, which instructions, when executed by one or more processors, cause the one or more processors to carry out the steps of:
receiving an indication that a first process has failed, the first process having been engaged in communications over a network connection with a second process, the network connection having a source address and a destination address;
retrieving from a database information about the network connection, wherein the information retrieved from the database indicates the source address and the destination address of the network connection;
determining a random number;
based on the information retrieved from the database, forming a packet comprising the source address, the destination address, a sequence field set to the random number, and a SYN field set to 1;
wherein the packet is formed by a third process that is different from the first and second processes; and
the third process sending the packet to the second process; thereby causing the second process to close the network connection with the first process;
wherein the random number falls within an expected sequence number range of the second process; thereby causing the second process to send a reset packet to the first process prior to closing the network connection.

16. A computer-readable storage medium as recited in claim 15, further comprising instructions which, when executed by the one or more processors, cause the one or more processors to carry out the steps of:
wherein the first process was engaged in communications over a plurality of network connections with the second process, each network connection of the plurality of network connections having a corresponding source address and a destination address;
retrieving from a database information about each network connection of the plurality of network connections;
wherein the information about each network connection comprises information about corresponding source addresses and destination addresses; and
based on the database information about each network connection, for each network connection of the plurality of network connections, the third process forming and sending to the second process a packet comprising the corresponding source address, the corresponding destination address, a sequence field set to a random number, and a SYN field set to 1.

17. A computer-readable storage medium as recited in claim 15, wherein the packet further includes a source port value corresponding to the first process and a destination port value corresponding to the second process.

18. A computer-readable storage medium as recited in claim 15, wherein the packet further includes an ACK field set to 0.

19. A computer-readable storage medium as recited in claim 15, wherein the instructions for carrying out the steps of receiving, forming and sending are performed on a standby route processor of a multiple route processor router.

20. A computer-readable storage medium as recited in claim 15, wherein the instructions for carrying out the steps of receiving, forming are performed on a route processor of a router.

21. A computer-readable storage medium as recited in claim 16, further comprising instructions which, when executed by the one or more processors, cause the one or more processors to carry out the steps of:
storing in the database information about one or more specified network connections associated with the first process for which reset processing is desired.

22. A computer-readable storage medium as recited in claim 21, wherein the information about each network connection comprises: a source IP address, a destination IP address, source TCP port and a destination TCP port.

23. A computer-readable storage medium as recited in claim 22, wherein the information about each network connection further comprises: an encryption signature.

24. A computer-readable storage medium as recited in claim 15, wherein the first process comprises a border gateway protocol (BGP) process.

25. A computer-readable storage medium as recited in claim 15, wherein the first process and the second process communicate using transmission control protocol (TOP) protocol.

26. A computer-readable storage medium as recited in claim 15, wherein the instructions for carrying out the step of receiving an indication that a first process has failed comprise instructions for carrying out the step of:
receiving a message from a monitoring process provided by an operating system of a router.

27. A computer-readable storage medium as recited in claim 15, wherein the instructions for carrying out the step of receiving an indication that a first process has failed comprise instructions for carrying out the step of:
  receiving a message from a monitoring process remotely located on a separate platform from the first process.

28. A computer-readable storage medium storing one or more sequences of instructions for detecting a protocol failure, which instructions, when executed by one or more processors, cause the one or more processors to carry out the steps of:
  receiving an indication that a first process has failed, the first process having been engaged in communications over one or more network connections with a second process;
  retrieving from a database information about each network connection associated with the first process;
  determining a random number;
  forming a packet comprising one or more data values, including a sequence field set to the random number and a SYN field set to 1, which packet, when received and processed by the second process, will cause the second process to close the network connection;
  wherein the packet is formed by a third process;
  sending the packet to the second process; thereby causing the second process to close the network connection; and
  receiving an ACK packet from the second process, if the random number falls outside of an expected sequence number range of the second process; and responsive thereto:
    retrieving from the ACK packet a sequence number and an acknowledgement number;
    forming a reset packet comprising a sequence number based upon the acknowledgement number; and
    sending the reset packet to the second process.

29. An apparatus for detecting a protocol failure, comprising:
  means for receiving an indication that a first process has failed, the first process having been engaged in communications over a network connection with a second process, the network connection having a source address and a destination address;
  means for retrieving from a database information about the network connection, wherein the information retrieved from the database indicates the source address and the destination address of the network connection;
  means for determining a random number;
  means for forming, based on the information retrieved from the database, a packet comprising the source address, the destination address, a sequence field set to the random number, and a SYN field set to 1;
  wherein the means for forming the packet is operable in a third process that is different from the first and second processes; and
  means for sending the packet to the second process; thereby causing the second process to close the network connection with the first process;
  wherein where the random number falls within an expected sequence number range of the second process, the means for sending the packet to the second process causes the second process to send a reset packet to the first process prior to closing the network connection;
  wherein the means for sending the packet is operable in the third process.

30. An apparatus for detecting a protocol failure, comprising:
  means for receiving an indication that a first process has failed, the first process having been engaged in communications over one or more network connections with a second process;
  means for retrieving from a database information about each network connection associated with the first process;
  means for determining a random number;
  means for forming a packet comprising one or more data values, including a sequence field set to the random number and a SYN field set to 1, which packet, when received and processed by the second process, will cause the second process to close the network connection;
  wherein the means for forming a packet is operable in a third process;
  means for sending the packet to the second process; thereby causing the second process to close the network connection; and
  means for receiving an ACK packet from the second process, if the random number falls outside of an expected sequence number range of the second process;
  means for retrieving from the ACK packet a sequence number and an acknowledgement number;
  means for forming a reset packet comprising a sequence number based upon the acknowledgement number; and
  means for sending the reset packet to the second process.

31. An apparatus for detecting a protocol failure, comprising:
  a network interface that is coupled to a data network for receiving one or more packet flows therefrom;
  a processor;
  one or more stored sequences of instructions which, when executed by the processor, cause the processor to carry out the steps of:
    receiving an indication that a first process has failed, the first process having been engaged in communications over a network connection with a second process, the network connection having a source address and a destination address;
    retrieving from a database information about the network connection, wherein the information retrieved from the database indicates the source address and the destination address of the network connection;
    determining a random number;
    based on the information retrieved from the database, forming a packet comprising the source address, the destination address, a sequence field set to the random number, and a SYN field set to 1;
    wherein the packet is formed by a third process that is different from the first and second processes;
    the third process sending the packet to the second process; thereby causing the second process to close the network connection with the first process;
    wherein the random number falls within an expected sequence number range of the second process; thereby causing the second process to send a reset packet to the first process prior to closing the network connection.

32. An apparatus for detecting a protocol failure, comprising:
  a network interface that is coupled to a data network for receiving one or more packet flows therefrom;
  a processor;
  one or more stored sequences of instructions which, when executed by the processor, cause the processor to carry out the steps of:

receiving an indication that a first process has failed, the first process having been engaged in communications over one or more network connections with a second process;

retrieving from a database information about each network connection associated with the first process;

determining a random number;

forming a packet comprising one or more data values, including a sequence field set to the random number and a SYN field set to 1, which packet, when received and processed by the second process, will cause the second process to close the network connection;

wherein the packet is formed by a third process;

sending the packet to the second process; thereby causing the second process to close the network connection; and receiving an ACK packet from the second process, if the random number falls outside of an expected sequence number range of the second process; and responsive thereto:

retrieving from the ACK packet a sequence number and an acknowledgement number;

forming a reset packet comprising a sequence number based upon the acknowledgement number; and sending the reset packet to the second process.

33. A network element, comprising:

a transmission control protocol (TOP) process;

a border gateway protocol (BGP) process;

a system monitor process; and a fast recovery process, the fast recovery process comprising:

receiving an indication that a first process has failed, the first process having been engaged in communications over a network connection with a second process, the network connection having a source address and a destination address;

retrieving from a database information about the network connection, wherein the information retrieved from the database indicates the source address and the destination address of the network connection;

determining a random number;

based on the information retrieved from the database, forming a packet comprising the source address, the destination address, a sequence field set to the random number, and a SYN field set to 1;

wherein the fast recovery process is different from the first and second processes; and sending the packet to the second process; thereby causing the second process to close the network connection with the first process;

wherein the random number falls within an expected sequence number range of the second process; thereby causing the second process to send a reset packet to the first process prior to closing the network connection;

wherein the first process is the transmission control protocol (TOP) process or the border gateway protocol (BGP) process;

wherein the transmission control protocol (TCP) process, the border gateway protocol (BGP) process, the system monitor process, and the fast recovery process are performed by one or more computing devices.

34. The network element of claim 33, wherein the first process was engaged in communications over a plurality of network connections with the second process, each network connection of the plurality of network connections having a corresponding source address and a destination address, the fast recovery process further comprising:

retrieving from a database information about each network connection of the plurality of network connections;

wherein the information about each network connection comprises information about corresponding source addresses and destination addresses; and based on the database information about each network connection, for each network connection of the plurality of network connections, the fast recovery process forming and sending to the second process a packet comprising the corresponding source address, the corresponding destination address, a sequence field set to a random number, and a SYN field set to 1.

35. The network element of claim 33, wherein the random number falls within an expected sequence number range of the second process; thereby causing the second process to send a reset packet to the first process prior to closing the network connection.

36. The network element of claim 33, wherein the random number falls outside of the expected sequence number range of the second process, the fast recovery process further comprising:

receiving an ACK packet from the second process;

retrieving from the ACK packet a sequence number and an acknowledgement number;

forming a reset packet comprising a sequence number based upon the acknowledgement number; and sending the reset packet to the second process.

37. The apparatus of claim 31, wherein the first process was engaged in communications over a plurality of network connections with the second process, each network connection of the plurality of network connections having a corresponding source address and a destination address, the one of more stored sequences of instructions further comprising instructions, which when executed by the processor, cause the processor to carry out the steps of:

retrieving from a database information about each network connection of the plurality of network connections;

wherein the information about each network connection comprises information about corresponding source addresses and destination addresses; and based on the database information about each network connection, for each network connection of the plurality of network connections, the third process forming and sending to the second process a packet comprising the corresponding source address, the corresponding destination address, a sequence field set to a random number, and a SYN field set to 1.

38. The apparatus of claim 29, wherein the first process was engaged in communications over a plurality of network connections with the second process, each network connection of the plurality of network connections having a corresponding source address and a destination address, the apparatus further comprising:

means for retrieving from a database information about each network connection of the plurality of network connections;

wherein the information about each network connection comprises information about corresponding source addresses and destination addresses; and means for forming and sending, for each network connection of the plurality of network connections, based on the database information about each network connection, a packet comprising the corresponding source address, the corresponding destination address, a sequence field set to a random number, and a SYN field set to 1;

wherein the means for forming and sending the packet is operable in a third process that is different from the first and second processes.

39. A method as recited in claim 14, wherein forming a reset packet comprising a sequence number based upon the acknowledgement number comprises:

forming the packet having a sequence number field set based upon the acknowledgement number and a RST field set to 1.

40. A method as recited in claim 39, wherein the packet further includes a source port value corresponding to the first process and a destination port value corresponding to the second process.

41. A method as recited in claim 39, wherein the packet further includes an ACK field set to the random number.

42. The computer-readable storage medium as recited in claim 28, wherein the instructions for carrying out the step of forming a reset packet comprising a sequence number based upon the acknowledgement number further comprise instructions for carrying out the step of:

forming the packet having a sequence number field set based upon the acknowledgement number and a RST field set to 1.

43. The computer-readable storage medium as recited in claim 42, wherein the packet further includes a source port value corresponding to the first process and a destination port value corresponding to the second process.

44. The computer-readable storage medium as recited in claim 42, wherein the packet further includes an ACK field set to the random number.

45. The apparatus as recited in claim 30, wherein the means for forming a reset packet comprising a sequence number based upon the acknowledgement number further comprises:

means for forming the packet having a sequence number field set based upon the acknowledgement number and a RST field set to 1.

46. The apparatus as recited in claim 45, wherein the packet further includes a source port value corresponding to the first process and a destination port value corresponding to the second process.

47. The apparatus as recited in claim 45, wherein the packet further includes an ACK field set to the random number.

48. The apparatus as recited in claim 32, wherein the instructions for carrying out the step of forming a reset packet comprising a sequence number based upon the acknowledgement number further comprise instructions for carrying out the step of:

forming the packet having a sequence number field set based upon the acknowledgement number and a RST field set to 1.

49. The apparatus as recited in claim 48, wherein the packet further includes a source port value corresponding to the first process and a destination port value corresponding to the second process.

50. The apparatus as recited in claim 48, wherein the packet further includes an ACK field set to the random number.

\* \* \* \* \*

UNITED STATES PATENT AND TRADEMARK OFFICE
CERTIFICATE OF CORRECTION

PATENT NO. : 7,623,464 B2  Page 1 of 1
APPLICATION NO. : 10/888122
DATED : November 24, 2009
INVENTOR(S) : Appanna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1196 days.

Signed and Sealed this

Fourteenth Day of December, 2010

David J. Kappos
*Director of the United States Patent and Trademark Office*